United States Patent
Bansal et al.

(10) Patent No.: US 8,335,690 B1
(45) Date of Patent: *Dec. 18, 2012

(54) METHOD AND SYSTEM FOR CREATING NATURAL LANGUAGE UNDERSTANDING GRAMMARS

(75) Inventors: Dhananjay Bansal, Cambridge, MA (US); Nancy Gardner, Rockport, ME (US); Chang-Quin Shu, Orlando, FL (US); Kristie Goss, Sylacauga, AL (US); Matthew Yuschik, Cincinnati, OH (US); Sunil Issar, Ashburn, VA (US); Woosung Kim, Lexington, MA (US); Jayant Naik, Mason, OH (US)

(73) Assignee: Convergys Customer Management Delaware LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,383

(22) Filed: Jan. 17, 2012
(Under 37 CFR 1.47)

Related U.S. Application Data

(63) Continuation of application No. 12/414,060, filed on Mar. 30, 2009, which is a continuation of application No. 12/196,713, filed on Aug. 22, 2008, now abandoned.

(60) Provisional application No. 60/957,555, filed on Aug. 23, 2007.

(51) Int. Cl.
*G10L 21/00* (2006.01)
(52) U.S. Cl. ............ 704/257; 704/270; 704/270.1; 704/275
(58) Field of Classification Search .......... 704/257, 704/270, 270.1, 275
See application file for complete search history.

(56) References Cited

U.S. PATENT DOCUMENTS

| | | | |
|---|---|---|---|
| 5,819,220 | A | 10/1998 | Sarukkai |
| 5,915,001 | A | 6/1999 | Uppalura |
| 6,167,368 | A | 12/2000 | Wacholder |
| 6,167,369 | A | 12/2000 | Schulze |
| 6,173,266 | B1 | 1/2001 | Marx |
| 6,178,404 | B1 | 1/2001 | Hambleton et al. |
| 6,192,110 | B1 | 2/2001 | Abella |
| 6,212,502 | B1 | 4/2001 | Ball |
| 6,226,361 | B1 | 5/2001 | Koyama |
| 6,233,547 | B1 | 5/2001 | Denber |
| 6,243,680 | B1 | 6/2001 | Gupta et al. |
| 6,243,684 | B1 | 6/2001 | Stuart et al. |
| 6,249,809 | B1 | 6/2001 | Bro |
| 6,253,173 | B1 | 6/2001 | Ma |
| 6,256,620 | B1 | 7/2001 | Jawahar et al. |

(Continued)

FOREIGN PATENT DOCUMENTS

EP 0 973 314 1/2000

(Continued)

OTHER PUBLICATIONS

U.S. Appl. No. 11/055,894, filed Feb. 11, 2005, Piano et al.

(Continued)

*Primary Examiner* — Talivaldis Ivars Smits
*Assistant Examiner* — Shaun Roberts
(74) *Attorney, Agent, or Firm* — Frost Brown Todd LLC

(57) ABSTRACT

Grammars for interactive voice response systems using natural language understanding can be created using information which is available on websites. These grammars can be created in automated manners and can have various tuning measures applied to obtain optimal results when deployed in a customer contact environment. These grammars can allow a variety of statements to be appropriately handled by the system.

4 Claims, 7 Drawing Sheets

U.S. PATENT DOCUMENTS

| | | |
|---|---|---|
| 6,275,806 B1 | 8/2001 | Pertushin |
| 6,324,512 B1 | 11/2001 | Junqua et al. |
| 6,343,116 B1 | 1/2002 | Quinton |
| 6,356,869 B1 | 3/2002 | Chapados |
| 6,359,982 B1 | 3/2002 | Foster et al. |
| 6,366,658 B1 | 4/2002 | Bjornberg et al. |
| 6,381,640 B1 | 4/2002 | Beck |
| 6,389,126 B1 | 5/2002 | Bjornberg et al. |
| 6,393,428 B1 | 5/2002 | Miller |
| 6,401,061 B1 | 6/2002 | Zieman et al. |
| 6,411,926 B1 | 6/2002 | Chang |
| 6,427,002 B2 | 7/2002 | Campbell et al. |
| 6,442,519 B1 | 8/2002 | Kanevsky |
| 6,449,588 B1 | 9/2002 | Bowman-Amuah |
| 6,487,277 B2 | 11/2002 | Beyda |
| 6,496,567 B1 | 12/2002 | Bjornberg |
| 6,498,921 B1 | 12/2002 | Ho |
| 6,519,571 B1 | 2/2003 | Guheen |
| 6,519,580 B1 | 2/2003 | Johnson |
| 6,539,419 B2 | 3/2003 | Beck |
| 6,567,805 B1 | 5/2003 | Johnson |
| 6,571,225 B1 | 5/2003 | Oles |
| 6,574,599 B1 | 6/2003 | Lim |
| 6,584,180 B2 | 6/2003 | Nemoto |
| 6,587,558 B2 | 7/2003 | Lo |
| 6,594,684 B1 | 7/2003 | Hodjat |
| 6,598,039 B1 | 7/2003 | Livowsky |
| 6,604,075 B1 | 8/2003 | Brown et al. |
| 6,606,598 B1 | 8/2003 | Holthouse |
| 6,611,825 B1 | 8/2003 | Billheimer et al. |
| 6,615,172 B1 | 9/2003 | Bennett |
| 6,618,725 B1 | 9/2003 | Fukuda |
| 6,633,846 B1 | 10/2003 | Bennett et al. |
| 6,643,622 B2 | 11/2003 | Stuart |
| 6,647,111 B1 | 11/2003 | Bjornberg |
| 6,652,283 B1 | 11/2003 | Van Schaack |
| 6,654,798 B1 | 11/2003 | Skibinski et al. |
| 6,665,640 B1 | 12/2003 | Bennett |
| 6,665,644 B1 | 12/2003 | Kanevsky |
| 6,675,159 B1 | 1/2004 | Lin et al. |
| 6,701,311 B2 | 3/2004 | Biebesheimer |
| 6,721,416 B1 | 4/2004 | Farrell et al. |
| 6,725,209 B1 | 4/2004 | Iliff |
| 6,728,707 B1 | 4/2004 | Wakefield et al. |
| 6,735,578 B2 | 5/2004 | Shetty et al. |
| 6,741,699 B1 | 5/2004 | Flockhart |
| 6,757,676 B1 | 6/2004 | Sugaya et al. |
| 6,760,705 B2 | 7/2004 | Dvorak |
| 6,763,104 B1 | 7/2004 | Judkins |
| 6,766,320 B1 | 7/2004 | Wang |
| 6,772,190 B2 | 8/2004 | Hodjat |
| 6,775,358 B1 | 8/2004 | Breitenbach |
| 6,778,951 B1 | 8/2004 | Contractor |
| 6,785,376 B2 | 8/2004 | Genette |
| 6,804,711 B1 | 10/2004 | Dugan |
| 6,810,111 B1 | 10/2004 | Hunter |
| 6,810,375 B1 | 10/2004 | Ejerhed |
| 6,842,737 B1 | 1/2005 | Stiles |
| 6,842,877 B2 | 1/2005 | Robarts |
| 6,871,174 B1 | 3/2005 | Dolan |
| 6,885,734 B1 | 4/2005 | Eberle |
| 6,910,003 B1 | 6/2005 | Arnold |
| 6,915,246 B2 | 7/2005 | Gusler |
| 6,924,828 B1 | 8/2005 | Hirsch |
| 6,931,434 B1 | 8/2005 | Donoho |
| 6,938,000 B2 | 8/2005 | Joseph et al. |
| 6,941,266 B1 | 9/2005 | Gorin et al. |
| 6,952,470 B1 | 10/2005 | Tioe |
| 6,961,720 B1 | 11/2005 | Nelken |
| 6,970,821 B1 | 11/2005 | Shambaugh |
| 6,973,429 B2 | 12/2005 | Smith |
| 6,993,475 B1 | 1/2006 | McConnell |
| 7,019,749 B2 | 3/2006 | Guo |
| 7,054,813 B2 | 5/2006 | Lewis et al. |
| 7,062,444 B2 | 6/2006 | He et al. |
| 7,093,129 B1 | 8/2006 | Gavagni et al. |
| 7,257,530 B2 | 8/2007 | Yin |
| 7,331,036 B1 | 2/2008 | Hambleton et al. |
| 7,685,585 B1 | 3/2010 | Stienstra |
| 7,739,258 B1 | 6/2010 | Halevy et al. |
| 2001/0010714 A1 | 8/2001 | Nemoto |
| 2001/0014146 A1 | 8/2001 | Beyda et al. |
| 2001/0047261 A1 | 11/2001 | Kassan |
| 2001/0049688 A1 | 12/2001 | Fratkina |
| 2001/0056346 A1 | 12/2001 | Ueyama |
| 2001/0056352 A1 | 12/2001 | Xun |
| 2002/0010574 A1 | 1/2002 | Tsourikov et al. |
| 2002/0026435 A1 | 2/2002 | Wyss |
| 2002/0032740 A1 | 3/2002 | Stern et al. |
| 2002/0062315 A1 | 5/2002 | Weiss |
| 2002/0087325 A1 | 7/2002 | Lee |
| 2002/0103871 A1 | 8/2002 | Pustejovsky |
| 2002/0143548 A1 | 10/2002 | Korall |
| 2002/0146668 A1 | 10/2002 | Burgin et al. |
| 2002/0161626 A1 | 10/2002 | Plante |
| 2002/0188567 A1 | 12/2002 | Candelore |
| 2002/0194004 A1 | 12/2002 | Glinski et al. |
| 2002/0194230 A1 | 12/2002 | Polanyi et al. |
| 2002/0196679 A1 | 12/2002 | Lavi et al. |
| 2002/0198701 A1 | 12/2002 | Moore |
| 2003/0053615 A1 | 3/2003 | Anderson |
| 2003/0061025 A1 | 3/2003 | Abir |
| 2003/0078766 A1 | 4/2003 | Appelt et al. |
| 2003/0078781 A1 | 4/2003 | Julia et al. |
| 2003/0125929 A1 | 7/2003 | Bergstraesser et al. |
| 2003/0167266 A1 | 9/2003 | Saldanha et al. |
| 2003/0212558 A1 | 11/2003 | Matula |
| 2003/0233224 A1 | 12/2003 | Marchisio et al. |
| 2004/0006476 A1 | 1/2004 | Chiu |
| 2004/0030741 A1 | 2/2004 | Wolton et al. |
| 2004/0062380 A1 | 4/2004 | Delaney |
| 2004/0068497 A1 | 4/2004 | Rishel |
| 2004/0083092 A1 | 4/2004 | Vallas |
| 2004/0122941 A1 | 6/2004 | Creamer |
| 2004/0141508 A1 | 7/2004 | Schoeneberger et al. |
| 2004/0153322 A1 | 8/2004 | Neuberger et al. |
| 2004/0162724 A1 | 8/2004 | Hill |
| 2004/0162812 A1 | 8/2004 | Lane |
| 2004/0162824 A1 | 8/2004 | Burns |
| 2004/0174979 A1 | 9/2004 | Hutton |
| 2004/0204940 A1 | 10/2004 | Alshawi |
| 2004/0225499 A1 | 11/2004 | Wang |
| 2004/0243417 A9 | 12/2004 | Pitts |
| 2004/0243645 A1 | 12/2004 | Broder et al. |
| 2004/0267628 A1 | 12/2004 | Stillman |
| 2005/0105712 A1 | 5/2005 | Williams |
| 2005/0131675 A1 | 6/2005 | Julia et al. |
| 2005/0154580 A1 | 7/2005 | Horowitz et al. |
| 2005/0171932 A1 | 8/2005 | Nandra |
| 2005/0187931 A1 | 8/2005 | Cofino |
| 2006/0059028 A1 | 3/2006 | Eder |
| 2006/0080107 A1 | 4/2006 | Hill |
| 2007/0038436 A1 | 2/2007 | Cristo et al. |
| 2007/0179776 A1 | 8/2007 | Segond et al. |
| 2007/0208555 A1 | 9/2007 | Blass et al. |
| 2007/0219780 A1 | 9/2007 | Roche et al. |
| 2008/0071533 A1 | 3/2008 | Cave et al. |
| 2008/0201133 A1 | 8/2008 | Cave et al. |

FOREIGN PATENT DOCUMENTS

| | | |
|---|---|---|
| EP | 0 982 916 | 3/2000 |
| EP | 1 191 772 | 3/2002 |
| EP | 0 977 175 | 11/2005 |
| GB | 2 342 528 | 12/2000 |
| GB | 2 390 191 | 12/2003 |
| GB | 2420192 | 5/2006 |
| JP | 10133847 | 5/1998 |
| JP | 2000112486 | 4/2000 |
| JP | 2002055695 | 2/2002 |
| JP | 2002189483 | 7/2002 |
| JP | 2002366552 | 12/2002 |
| JP | 2002374356 | 12/2002 |
| WO | WO 98/13974 | 4/1998 |
| WO | WO 99/53676 | 10/1999 |
| WO | WO 00/73955 | 12/2000 |
| WO | WO 01/33414 | 5/2001 |
| WO | WO 01/35617 | 5/2001 |

| | | |
|---|---|---|
| WO | WO 01/82123 | 11/2001 |
| WO | WO 02/09399 | 1/2002 |
| WO | WO 02/35376 | 5/2002 |
| WO | WO 02/51114 | 6/2002 |
| WO | WO 02/061730 | 8/2002 |
| WO | WO 02/073331 | 9/2002 |
| WO | WO 2004/072926 | 8/2004 |
| WO | WO 2005/006116 | 1/2005 |
| WO | WO 2006/093789 | 9/2006 |

OTHER PUBLICATIONS

U.S. Appl. No. 11/198,934, filed Aug. 5, 2005, Claridge et al.
U.S. Appl. No. 11/276,497, filed Mar. 2, 2006, Peterson.
U.S. Appl. No. 11/291,562, filed Dec. 1, 2005, Shomo et al.
U.S. Appl. No. 11/565,702, filed Dec. 1, 2006, Coy et al.
U.S. Appl. No. 11/751,976, filed May 22, 2007, Naik et al.
U.S. Appl. No. 11/966,393, filed Dec. 28, 2007, Yuschik et al.
U.S. Appl. No. 60/991,242, filed Nov. 30, 2007, Yuschik.
Office Action dated Jul. 13, 2010 for U.S. Appl. No. 11/198,934.
Office Action dated Oct. 17, 2008 for U.S. Appl. No. 11/276,497.
Office Action dated Feb. 19, 2009 for U.S. Appl. No. 11/276,497.
Office Action dated Mar. 13, 2009 for U.S. Appl. No. 11/276,497.
Office Action dated May 14, 2009 for U.S. Appl. No. 11/291,562.
Office Action dated Aug. 10, 2010 for U.S. Appl. No. 11/565,702.
Office Action dated Jan. 6, 2011 for U.S. Appl. No. 11/565,702.
Office Action dated Nov. 26, 2010 for U.S. Appl. No. 11/751,976.
Office Action dated May 27, 2011 for U.S. Appl. No. 11/751,976.
Office Action dated Nov. 14, 2011 for U.S. Appl. No. 11/751,976.
Office Action dated Oct. 7, 2010 for U.S. Appl. No. 11/966,393.
Office Action dated Mar. 8, 2011 for U.S. Appl. No. 11/966,393.
Abstract for JP 10133847.
Abstract for JP 2000112486.
Abstract for JP 2002055695.
Abstract for JP 2002189483.
Abstract for JP 2002366552.
Abstract for JP 2002374356.

How to apply

- Continue with application
  - Phone: (888) 555-1212, Monday through Friday, 8:00am to 6:00pm ET
  - In person: find a Branch or Office near you
    - By mail:
  o Complete and sign the Roth IRA Plan Application and read the Roth IRA Fact Book
    o Return completed forms, along with contributions, to:

Retirement Resource Center
  Mail Code XX1234
  9876 West W.S. Morriss Blvd.
  Juneau, AK 99801

What you need to apply
You will need the following pieces of information:
- Your Social Security Number (if applicable)
- Beneficiary's Social Security Number and Date of Birth
- If you are rolling over an employer-sponsored plan, you will need your plan provider/administrator's name and contact information What to expect when applying online
- The application will take approximately 20 minutes to complete.
- Within two business days after we receive your application, a Retirement Specialist will contact you to discuss your retirement needs.
- After speaking with a Retirement Specialist, final account forms will be sent for you to sign and return.

```
For each leaf webpage "L" do ←—507
{
        For each depth H=1 to N do
        {
                Get all ancestor web pages that can reach to L by following H links in sequence
                For each ancestor web page "A" do
                {
                        Get the textual information in "title" and "keywords" HTML fields of A ←—503
                        Get the textual information in the link in A that led to L ←——504
                        Add the ancestor data to the training data with weight 1/H ←—501
                }
                Get the textual information in "title" and "keywords" HTML fields in L ←—505
                Parse L to extract subtopics: Text enclosed between boldface HTML tags ←—506
                Add the leaf webpage data to the training data with weight 1 ←——502
        }
}
Normalize data: Expand acronyms, process punctuations
Add optional prefixes and suffixes
```

Figure 5

METHOD AND SYSTEM FOR CREATING NATURAL LANGUAGE UNDERSTANDING GRAMMARS

CROSS REFERENCE TO RELATED APPLICATIONS

This application is a continuation of, and claims the benefit of, U.S. patent application Ser. No. 12/414,060, filed Mar. 30, 2009, which itself claimed priority from U.S. patent application Ser. No. 12/196,713 filed on Aug. 22, 2008, which itself claimed priority from U.S. provisional application No. 60/957,555, which was filed on Aug. 23, 2007. All of those applications are entitled Method and System for Creating Natural Language Understanding Grammars, and are hereby incorporated by reference in their entirety.

FIELD

This invention is in the field of creation of interfaces for automated systems.

BACKGROUND

As a general rule, it is cheaper for an entity to process an interaction using an automated system than it is to process an interaction using live personnel (e.g., agents). However, existing automated systems for processing transactions are generally substantially less flexible than agents in handling transactions. Further, the more flexibility which is built into an automated system, generally the more expensive the creation of that system becomes. Accordingly, there is a need for automated systems which can flexibly handle interactions in a manner closer to that which is possible with human agents. There is also a need for an economically feasible method of creating those systems.

SUMMARY

As will be apparent to one of ordinary skill in the art in light of the disclosure set forth herein, the inventors' technology is suitable for implementation in a variety of different contexts. One example of a way that the inventors' technology could be implemented is in a system comprising an input connection, a computer, and a computer readable medium. In such a system, the input connection could be operable to receive a natural language input from a user, the computer readable medium could store a plurality of grammars, and the computer could be configured with a set of computer executable instructions operable to, during an interaction with the user, cause the computer to perform a set of acts.

Before continuing with the discussion of potential system implementations such as described above, the following definitions are provided, which should be used as an aid to understanding the disclosure set forth herein. Particularly, the term "grammar" should be understood to refer to a set of rules which constrain combinations of elements to be syntactically and semantically correct. Examples of grammars include transformational grammars, systemic grammars, functional grammars and frame based grammars, though it should be understood that the enumerated types of grammar are intended to be illustrative only, and that the teachings of this disclosure are not limited to being applied in the context of the enumerated types. Also an "interaction with a user" should be understood to refer to an exchange of inputs and responses (the "interaction") with someone utilizing a system (the "user," e.g., a customer or an agent). Further, the terms "computer" and "computer readable medium" should both be read broadly. Thus, a "computer" should be understood to refer to a device or group of devices which is capable of performing one or more logical and/or physical operations on data to produce a result, while a "computer readable medium" should be understood to refer to any object, substance, or combination of objects or substances, capable of storing data or instructions in a form in which they can be retrieved and/or processed by a computer.

Returning to the discussion of a system such as mentioned above, in such a system, the set of computer executable instructions could be operable to configure the computer to perform acts such as:
1) determining a goal for a user based on a natural language input from the user;
2) using a first grammar from the plurality of grammars stored on the computer readable medium, determining a set of information necessary for the user to provide for the goal to be completed;
3) determining a set of information missing from the information necessary to complete the goal;
4) based on a second grammar from the plurality of grammars, determining a prompt to provide the user to obtain one or more elements from the set of missing information; and
5) providing the prompt to the user.

For the purpose of clarity, certain terms used in the description above should be understood as having particular meanings. Thus, the phrase "based on" is used as an indication that something is determined at least in part by the thing that it is identified as being "based on." When something is completely determined by a thing, it will be described as being "based exclusively on" the thing. Also, the verb "determine" should be understood to refer to the act of generating, selecting or otherwise specifying something. For example, to obtain an output as the result of analysis would be an example of "determining" that output. As a second example, to choose a response from a list of possible responses would be a method of "determining" a response. Further, a "set" should be understood to mean a number, group, or combination of one or more things of similar nature, design, or function, while an "element" should be understood to refer to a discrete and identifiable thing. Thus, an example of an element from a set of missing information could be a departure time, if the user was expected to provide a departure time, but such time had not yet been provided. As another term which should be understood as having a particular meaning, the term "prompt" should be understood to refer to a provision of some kind of information or message from a system. For example, a prompt could be a spoken prompt intended to incite a response (e.g., "Is that correct?"), a text prompt responding to a user statement (e.g., "I'm booking your reservation now"), or some other type of provision entirely (e.g., a modification to a visual or tactile interface provided to a user). Of course, it should be understood that these examples of "prompts" are intended to be illustrative only, and should not be taken as limiting on the types of prompts which could be provided based on the disclosure set forth herein.

Of course, variations and extensions on systems of the type described above could also be implemented based on this disclosure. As one such extension, in some cases where a computer is configured to determine a prompt based on a grammar and provide that prompt to a user, the act of providing the prompt could comprise providing an auditory natural language output to the user, and altering a visual interface presented to the user (for example, if a user is interacting with a system via voice and the interne (e.g., co-browsing through Internet Explorer in combination with speaking to an interactive voice response system over the phone)). Thus, providing the prompt might comprise making a statement asking the user to provide missing departure information, and manipulating the user's browser interface to emphasize the request (e.g., by navigating to a flight information entry screen, and/ or by highlighting a flight information entry option on the user's browser). As another potential extension on a system such as mentioned above, in some cases the plurality of grammars might be organized according to a hierarchy having five levels. In such a hierarchy, the grammar from the lowest of the five levels could comprise a vocabulary comprising words corresponding to natural language statements, while the grammars for the other levels could comprise elements provided by a grammar from the next lower level in the hierarchy. Thus, based on the disclosure set forth herein, the grammars could be organized into a hierarchy where the bottom grammars determine words from a statement, the next level of grammar takes those words and identifies phrases, the next level of grammar takes the phrases and identifies sentences or clauses, the next level of grammar takes the sentences/clauses and identifies tasks, and the tasks are then grouped by the next level of grammar into transactions. Of course, as set forth herein, the described hierarchy is not the exclusive approach to implementing the technology developed by the inventors, and so the discussion herein should be understood as being illustrative only, and not limiting.

Another aspect of the technology described herein is the potential to use a website to determine grammars which could then be used in interactions which do not necessarily follow the website. For example, a system could be implemented which comprises a computer readable medium storing a plurality of grammars based on a website, and which comprises a computer configured to achieve a goal during an interaction with a user without requiring the interaction to follow the structure of the website. More concretely, a system could be created which comprises a plurality of grammars stored on a medium where the plurality of grammars are created or refined based on information from a website (e.g., the text which would be presented in a browser, the site's code, or data regarding the site's usage). The grammars could then be used to achieve a goal in an interaction without requiring the interaction to mimic the structure of the website. For example, the grammars could be used in an interaction where information was provided in a different order than it would be in the website, or in an interaction which combines what would have been separate steps in the website (e.g., the user can speak a single sentence providing all information that the website might have used several screens to obtain).

Of course, it should be understood that the description above of various systems is intended to be illustrative only, and should not be treated as indicating limits on potential implementations of the inventors' technology. As set forth herein, the inventors' technology is susceptible to implementation in a wide variety of contexts and applications. Accordingly, the discussion of that technology herein should be understood as being illustrative only, and not limiting.

BRIEF DESCRIPTION OF THE DRAWINGS

FIG. 3 depicts an exemplary web page.

FIG. 5 provides a pseudocode example of an algorithm which could be used to collect data for training a natural language grammar.

DETAILED DESCRIPTION

To avoid unnecessary complexity, this disclosure focuses on natural language aspects of interfaces, in particular to an interactive voice response system ("IVR") which should be understood to include any system which is capable of responding to one or more statements from a user using voice communication. However, interfaces using grammars such as described herein could also provide output in graphics or text or voice in a multimodal manner. For example, a system could be created so that, based on a user's natural language conversation with an interactive system, a screen presented to the user could be used to take the user to a web-page which is relevant to a statement made by the user, or present some graphic which the user might find helpful. Accordingly, the discussion herein should be treated as being illustrative of potential uses of the inventors' technology, but should not be treated as an exhaustive or limiting recitation of all potential applications in which that technology should be embodied.

Figure 6:
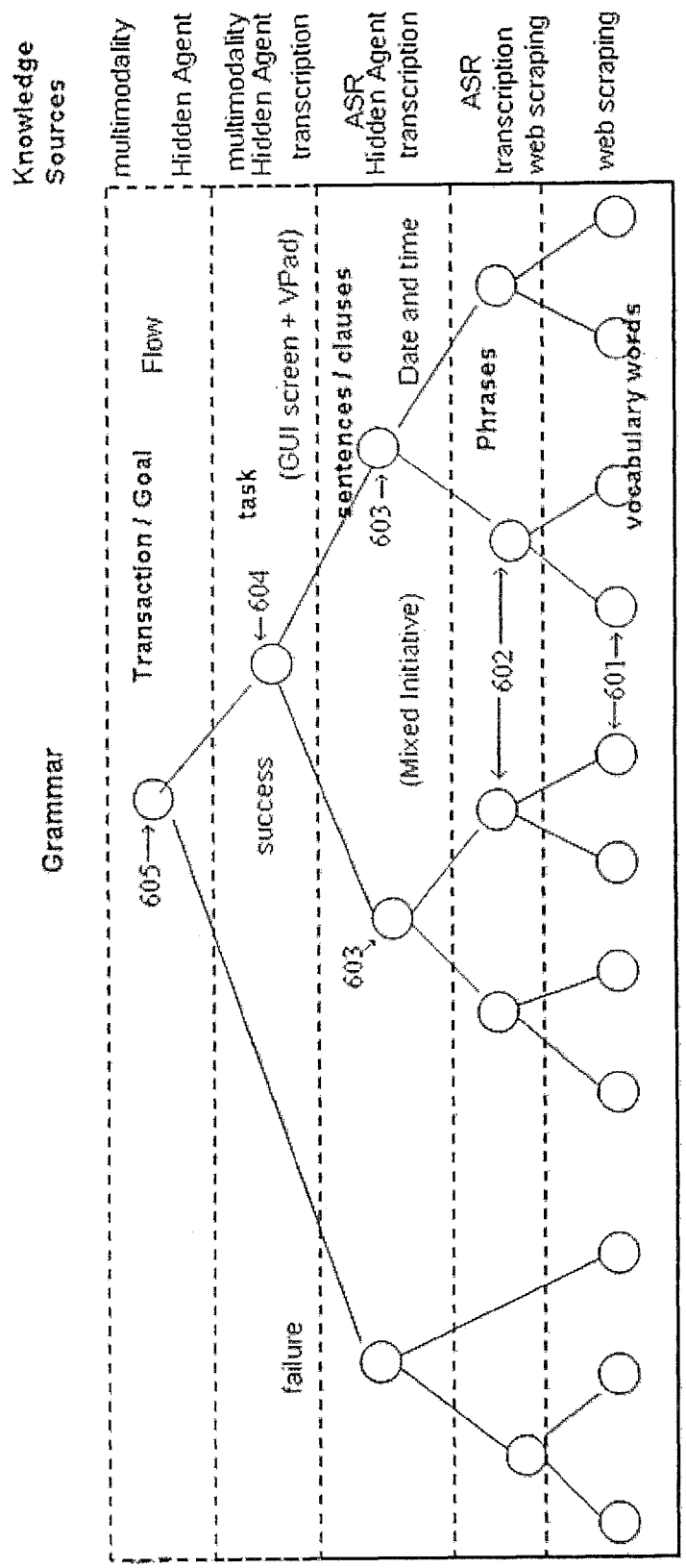
FIG. 6 depicts an abstraction hierarchy which could be used for a grammar.

Turning now to the discussion of grammars which could be used in an interactive system, consider the hierarchical representation of FIG. 6, which illustrates one way a grammar can be structured. In FIG. 6, the bottom level of the hierarchy is made up of words nodes [601] which represent words that might be used in an interaction with an IVR. The individual words are then combined to form phrases (represented by phrase nodes [602] in FIG. 6), that is, one or more words which are specifically related to a task in a transaction the user of the IVR might want to complete. For example, in a travel related transaction, there might be a noun phrase for airline numbers, which could be made up of the individual words for the carrier and the flight number (e.g., "Delta 1228") that could potentially be used in tasks such as scheduling a departure. At the next highest level of abstraction, a grammar organized as shown in FIG. 6 would include one or more sentence or clause nodes [603]. These nodes represent sentences or clauses, which, when representing statements by a user, should be understood to refer to a set of data (which could be represented as an utterance) which completes (or provides all information necessary for) a subtask in a transaction. To use an analogy for illustration, if a transaction is to be completed on a website, then a sentence or clause in the grammar could represent the information for one page on a website. Also, as a general matter, sentences/clauses can be treated as having a variety of categories, such as request sentences (e.g., sentences asking for information which could be included in a website), data entry sentences (e.g., sentences which explicitly provide information which could be entered into a field on a web-page), and table access sentences (sentences which request data that might be listed on a table in a web-page, such as what flights are scheduled between noon and six pm). There could also be various categories of sentences which could be used for error correction, such as sentences responding to caller confusion (e.g., when the caller says something like "I mean flight 2218"), sentences dealing with requests for clarification (e.g., if the caller says something like "what about other carriers"), and sentences which validate information from a caller (e.g., "Do you mean Delta flight 1228 from Cincinnati?"). Also, for some grammars, there could be sentences which are standard types of utterances spoken to users, such as yes/no question sentences. Of course, it should be understood that the examples of sentences provided above are not intended to be an exhaustive list of all sentence types and that other types of sentences could be used in various grammars, depending on factors such as how the grammar would eventually be used. Accordingly, the above discussion should be understood as being illustrative only, and not limiting.

Continuing with the discussion of FIG. 6, the next level of abstraction over sentences is the task level, which, in the hierarchy of FIG. 6, comprises at least one task node [604]. In a hierarchy such as FIG. 6, a task represented by a task node [604] is a composition of one or more sentences/clauses which completes a unitary portion of a transaction. For example, in an interactive travel system, a task could be to select a particular flight from a specific location at a specific date and time. In this case the task might be made up of one or more sentences/clauses which provide information such as the carrier, flight number, departure date, departure time, and departure city. Finally, in the hierarchy shown in FIG. 6, the top layer of a transaction (represented by the transaction node [605]) represents all information necessary to successfully complete a goal in an interaction with a user. For example, in an interactive travel system, there might be a transaction for making reservations which could comprise tasks such as determining a departure, determining a return, and determining a method of payment. Once all of the tasks for a transaction is completed, an interaction would be considered a success, and (depending on the design for the system) could be terminated.

Figure 7:
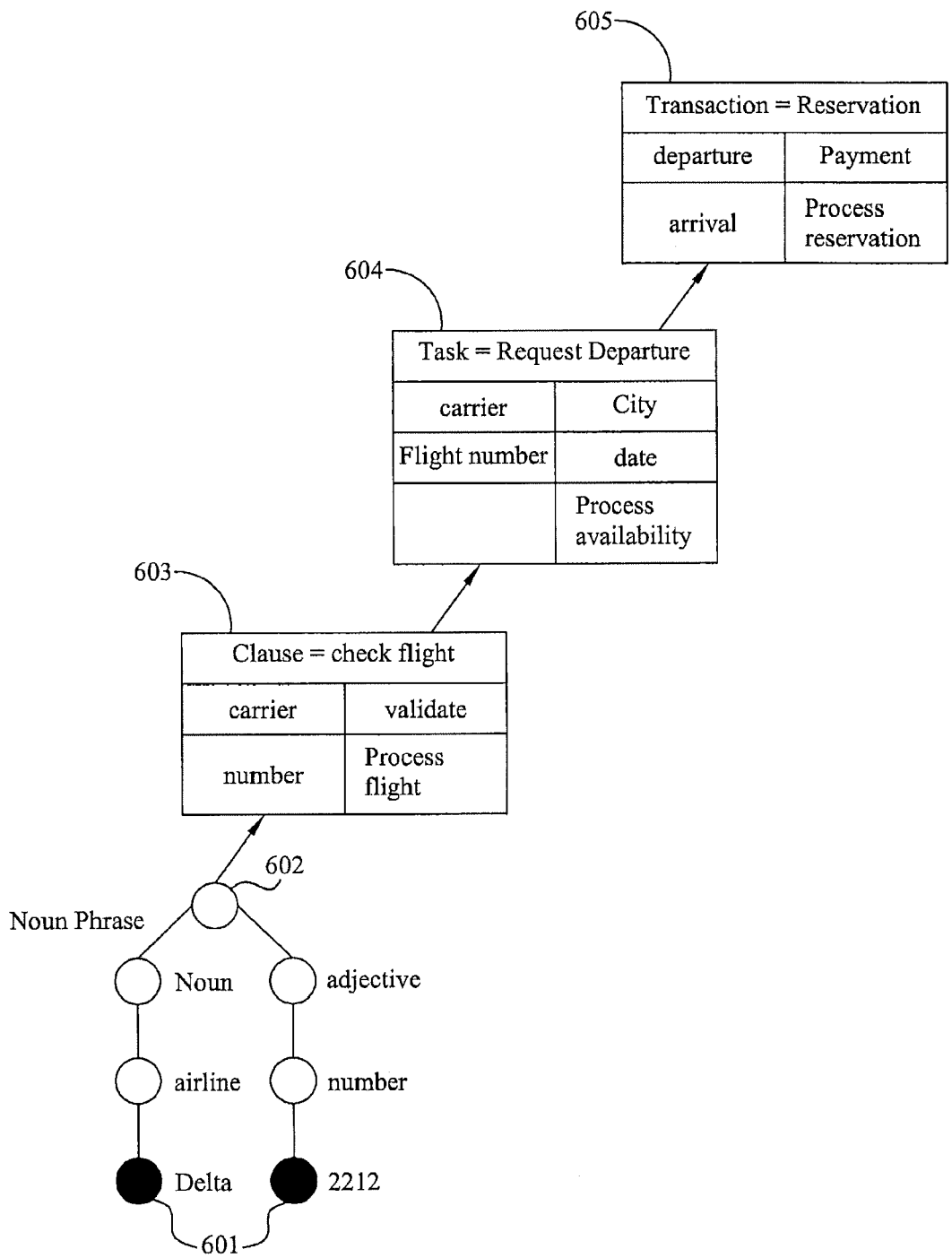
FIG. 7 depicts how various layers of an abstraction hierarchy could fit together to form a grammar.

As an illustration for how a grammar structured according to the description above for FIG. 6 could actually be used to make a reservation in an interactive travel system, such as an appropriately configured IVR (potentially one having a natural language interface), consider the following discussion, as well as the accompanying FIG. 7. Initially, a user of the system might call (or otherwise contact the system, such as by text message, instant message, going to a website, etc) and could make a statement such as "I want Delta 1228 from Cincinnati to LaGuardia on August $17^{th}$". The system could use the grammar to identify what the user has said in terms of words corresponding to word nodes [601] as discussed above. Further, as shown in FIG. 7, each of the individual words can be connected with a semantic tag (e.g., "Delta" is an airline, "1228" is a number) which can be used to organize the words into phrases corresponding to the phrase nodes [602] discussed above. The system could also use the grammar to recognize the meaning of the user's statement, and take some action based on it. For example, the grammar could be used to recognize noun phrases comprising an airline and a number as clauses which should trigger whether the indicated flight is available (e.g., whether it exists in the relevant databases in the back-end system, etc.). Similarly, the system could use the grammar to identify what type of a transaction (corresponding to a transaction node [605]) the user seeks to complete. For example, in many cases, the sequences of statements a user makes will be characteristic of the type of transaction the user seeks to complete. These characteristic sequences (called a "flow" for clarity) can be used to identify a transaction, and thereby identify the type of information needed from the user. Similarly, the types of words that a user uses in their statements (e.g., keywords which might be associated with a particular transaction type) could also be used to identify a transaction the user desires to accomplish. With the transaction identified, the system can then use the grammar to know what information needs to be provided by the user in order for the interaction to be a success. The system can then ask for further necessary information, as well as appropriately handling the information which the user may have already provided (which might, for example, have been stored in some kind of temporary memory if the information was provided before the system knew how it should be handled).

As will be apparent to one of ordinary skill in the art in light of the discussion set forth above, using one or more grammars as described above to provide a natural language interface will enable automated systems to engage in much more intuitive interactions with individual users than prior art systems, which may have been limited to presenting menus of options, then requesting that the user press a button on a telephone keypad corresponding to a choice from the menu. For example, an IVR with a natural language understanding interface of the type described above can enable a user to provide relevant information in any order the user desires to complete a transaction, rather than requiring the user to follow a predetermined and inflexible menu structure (e.g., "press 1 for departures, press 2 for arrivals . . . "). As an additional benefit which can be obtained through the use of a grammar such as described herein, it is possible in some cases to implement systems which are capable of error detection and remediation. For example, if a user makes a statement which is indecipherable or has incorrect information (e.g., requests to depart on a flight that does not exist), the fact that the system knows what information the user needs to provide to complete the transaction can allow it to identify the incorrect information (e.g., that a user is trying to book a departure on an arriving flight), and take appropriate action (e.g., suggesting alternatives for the user, or informing the user that the flight they have chosen is an arriving flight). Also, a natural language interface using grammars such as described herein could allow a transaction to be completed at a pace which is appropriate for the user. For instance, if the user is a power user, he or she could make a statement like "I want to fly from Cincinnati to Los Angeles on Jan. 1, 2009, on Delta flight 555, to return on January 14 on Delta flight 1212, and to pay using my American Express card, number 1234 5678 9101 1121" and the system could automatically use the information provided to fill in the necessary slots for a flight reservation transaction. By contrast, (in accordance with the description above) if the user was less experienced, and started with a statement like "I'd like to visit my sister in Los Angeles," the system could identify the transaction the user wished to accomplish, and provide prompts for the information necessary to complete it (e.g., "What dates were you planning for your visit?").

In terms of how a grammar such as described above could be built, there are a variety of ways this could take place, and a variety of sources of data which could be utilized in the creation of the grammar. For the sake of clarity, the discussion below is organized in terms of how individual levels of a hierarchy such as FIG. 6 could be created using various knowledge sources and processes. The discussion below is intended to illustrate potential approaches to implementing the inventors' technology, and is not intended to disclaim subject matter not explicitly recited, or to be used in a manner limiting on any claims which are included in this application or any related application.

Turning now to the lowest level in the hierarchy depicted in FIG. 6, it is possible that a variety of sources of data could be used to determine the vocabulary which would be used in the grammar. One such source of data is material taken from a website. For example, to create an interactive travel system such as described above, an automated process could be applied to a travel website which would retrieve the words which appear in the travel website, and use them to populate the vocabulary which would be used in a grammar such as described above. Additionally, records of interactions which have already taken place and are related to the subject matter of the grammar to be created could also be used. For example, to create a grammar for a travel system, transcriptions (whether created through manual transcription, automated speech recognizer ("ASR") transcription, or both) of conversations between callers and previously existing travel systems (e.g., those manned by human agents, prior art automated systems, or combined human automated systems) could be an additional source of information from which the vocabulary for a grammar such as described above could be derived. The vocabulary for the grammar could also be augmented by considering semantic equivalents for the words determined using the other sources of data (e.g., the transcriptions and website data). This consideration of semantic equivalents could also be performed using an automated process, for example, by taking the words in the vocabulary and adding the most common synonyms as indicated by a thesaurus, database, or other type of knowledge store.

Similar processes can be applied to determine phrases for the grammar. Sources of data such as a website (including, perhaps, underlying code, which might indicate that a phrase such as a combination of flight number and airline is significant by passing it to a back-end process), and records of previous interactions can be automatically analyzed to determine what statements from a user would be specifically related to various aspects of a transaction, and therefore should be recognized as phrases. Additionally, the determination of phrases might also be augmented by consideration of common elements of speaking style. For example, human to human interactions generally rely on basic rules of grammar and various colloquial usages (linguistic style) to communicate information. Information indicating common usages for various aspects of a transaction (e.g., various noun and verb phrases which are likely to be used by a user) can enable the phrases recognized in a grammar to be more reflective of those which would be included in an interaction than might otherwise be the case. The processes used for identifying phrases could, as with the processes used for identifying individual words, be automated (e.g., identification of words types likely to appear together, analysis of website code, etc), manual (e.g., phrases identified by a subject matter expert), or a combination of the two (e.g., supervised learning, where a subject matter expert could be employed to facilitate the automated process).

The next highest level, after the words and phrases discussed above, is the level of sentences/clauses. As with the words and phrases, sentences/clauses in a grammar could be determined manually or automatically (or using various combinations of manual and automatic processes) using a variety of input sources. Further, in some implementations, sentences corresponding to different types of subtasks in a transaction could be created using different types of data input, though, of course, cross-cutting (i.e., application to multiple different subtasks, levels in the hierarchy, etc) use of input data is also possible. As an example of this, data gathered from a website might be used to identify and categorize sentences which are used for requesting data (e.g., a program could create a sentence corresponding to a single page in a site, where the data required for the sentence is taken from the data requested on the page, and where the category of the sentence is determined based on the function of the underlying page, such as user data collection, back end database access, information validation, etc). However, for sentences used for error handling, a preferable source of information might be transcriptions of previous human-human interactions, where a human agent might have been able to identify confusion on the part of a user, and then make appropriate statements to help remedy that confusion. As another approach to the determination of sentences, it is possible that the words used in statements made during recorded transactions could be used to assign those statements to categories of sentences which would then be incorporated into the grammar (a process which could, of course, be augmented by the incorporation of semantic equivalents and common usages in a manner similar to that discussed above). The specific categories used for classifying the sentences could be automatically determined such as described above, or could be picked by a subject matter expert, though combinations of automatic and manual determination of categories are also possible.

Figure 2:
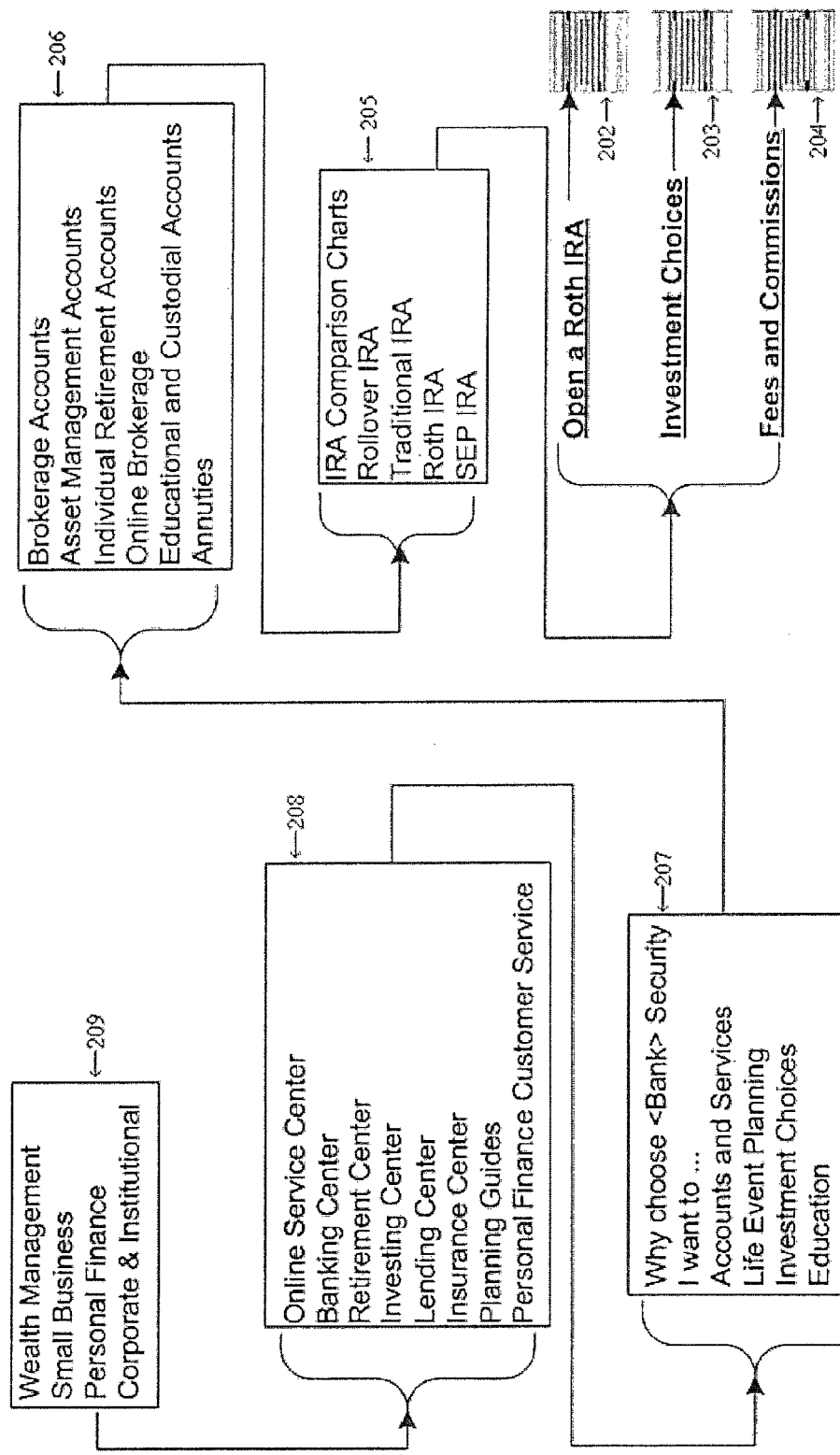
FIG. 2 depicts a map of a website.

Determining tasks can also be performed using automated or manual processes applied to various sources of data. For a website, tasks can be determined using information such as the structure of the site. As an illustration of this, consider that many websites are organized into a tree hierarchy made up of a plurality of terminal leaf pages, and a plurality of ancestor pages leading to those leaf pages. Such a website organization is depicted in FIG. 2, which depicts a map for a website [201] of a banking establishment. As shown in FIG. 2 that website [201] comprises a plurality of leaf pages [202][203][204] and a plurality of ancestor pages [205][206][207][208][209] (for the purpose of clarity, the term "ancestor page" should be understood to refer to those web pages from which a leaf page can be reached by following a trail of links from the "ancestor page."). As shown in FIG. 3 which depicts content which could be included in the leaf page for the topic "Open a Roth IRA" [202] from FIG. 2, leaf pages are web pages dedicated to a specific purpose, such as providing information on a particular topic. Such leaf pages can be used for identifying specific tasks to be included in a grammar. For example, in a website which has a payment leaf page (e.g., a page where the user enters his or her payment information) an automated process could create a payment task corresponding to the leaf page. Similar task creation could take place with pages related to reserving departures or arrivals, or other tasks which might be completed on a website. Of course, websites are not the only source of information which can be used for defining the task level of abstraction in a grammar. For example, in many interactions, a user is transferred from an automated system to a human agent in order to complete a transaction. Records of the interactions between the human agent and the user can then provide a strong basis for identifying tasks which might be used in a grammar. Of course, the tasks used in a grammar could also be supplied by a human subject matter expert, and combined manual and automated approaches are also possible (e.g., the automated system uses transcriptions and websites for an initial identification, and the human expert filters and supplements the automatically determined tasks, etc).

Transcriptions such as those discussed above could also be helpful in determining the transaction level of a grammar following the structure shown in FIG. 6. As discussed previously, a transaction node [605] would indicate all information necessary to successfully complete a goal in an interaction with a user. Records of interactions such as transcriptions can be very useful in determining these transactions because they can indicate what was accomplished during an interaction, and what information was necessary to accomplish it. Additionally, in some cases, the records of interactions could include information about the outcome of the interaction (e.g., user satisfied, interaction abandoned by user, user dissatisfied, transaction (un)successful, etc) which could be used to further refine the identification of transactions (e.g., abandoned calls would not be treated as successful interactions for identification of transactions). Information gleaned from operation of a website could also be used to determine transactions for a grammar. For example, browser or server logs indicating what a user had done on a website could be used in a manner similar to that described above in order to identify a user's goals in his or her interactions with a website. Also, explicit website feedback surveys could also be used as data to define transactions which people would be likely to engage in with a system using a grammar made based on a website. Of course, as with other aspects of the grammar, automated determination of transactions could be supplemented with manual input. For example, a subject matter expert could identify a set of transactions he or she believes a user is likely to use an automated system to engage in. Such a set of transactions could then be incorporated directly into a grammar, or could be refined and/or augmented with transactions automatically determined using techniques such as described above.

system when faced with a confused user, and incorporate that information into a grammar accordingly. The same is true of records of interactions between a user and a "hidden agent," that is, interactions where the user believes he or she is interacting with an automated system, but in which there is actually a human determining the actions that will be taken in the interaction. By examining the statements made by the hidden agent, and the actions taken by the hidden agent, it is possible to identify individual tasks and transactions which should be completed in interactions, as well as to determine how to deal with errors when they occur. As an example of how various sources of information might be mapped to various aspects of a grammar following a structure such as described in FIG. 6, consider the following table 1, which presents such a mapping:

TABLE 1 mappings between various types of information and aspects of a hierarchical grammar.

| | level | | manual transcription | web page scrape | ASR transcription | linguistic style | semantic equivalents | hidden agent | multimodal data |
|---|---|---|---|---|---|---|---|---|---|
| Item of Grammar | transactions | flow/goal | x | | | | | x | x |
| | tasks | categories | x | x | x | x | x | x | x |
| | sentences | requests | x | x | x | x | | x | |
| | (subtasks) | data entry | x | x | x | | x | | |
| | | errors | x | | | x | x | x | x |
| | | table access | x | x | x | | | | |
| | phrases | units | x | x | x | x | x | | |
| | words | vocabulary | x | x | x | | x | | |

Of course, it should be understood that the description above is not intended to be an exhaustive description of different information sources which could be used to create a grammar, or how those information sources could be integrated into the grammar itself. As an example of how an additional information source could be integrated into the creation of a grammar as described above, consider the information which may be recorded regarding an interaction between a caller and an agent operating a multimodal user interface. As described in U.S. provisional application No. 60/991,242 filed Nov. 30, 2007 by Yuschik et al., the disclosure of which is hereby incorporated by reference in its entirety, a multimodal user interface can be designed in such a way that there could be parallel interface structures for a system (e.g., a visual interface could have a sequence of screens for completing various tasks, while a spoken interface could allow an agent to streamline a transaction or provide various information in an order which might bypass one or more of the screens from the visual interface), so that an agent could use whatever modality was most appropriate for a particular situation. Information gained from records of interactions with agents utilizing a multimodal user interface (including the particular ways the agent uses the tools available in the interface) could potentially be usefully employed in grammar creation for tasks such as helping identify transaction types, as well as identifying transaction flows which could then be incorporated into a grammar. Also, information from multimodal user interface transactions could be beneficially applied to incorporating error handling capabilities into a grammar. For example, by examining what aspects of a multimodal interface an agent uses when confronted with a confused customer (which could be shown, for example, by identifying backtracks in the customer's statements) an automated process can identify what actions should be taken by a Thus, as shown, there can be a variety of mappings of information sources to aspects of a hierarchical grammar. For example, in some cases it could be true that $|A \cup B| - |A \cap B| \neq 0$ and that $B \cup C = A \cup C$, where A is the set of levels from the hierarchy in which at least one aspect of the hierarchical grammar (which could itself be a grammar) is revised based on a first type of information, B is the set of levels from the hierarchy in which at least one aspect of the hierarchical grammar (which could itself be a grammar) is revised based on a second type of information, and C is the set of levels from the hierarchy in which at least one aspect of the hierarchical grammar (which could itself be a grammar) is revised based on a third type of information. Further, for certain types of information, it could also be the case that $A \cup B \neq B$ and that $A \cup B \neq A$.

Of course, it should be understood that table 1 is not intended to be an exhaustive depiction of all potential mappings between types of information and aspects of a grammar and that other mappings and relationships than those set forth above are also possible. In some cases, information mappings not included in table 1 could be included in creating a grammar (e.g., the use of logs of website usage to determine transactions), while it is also possible that some types of information mapping depicted in table 1 might not be included in all instances of grammar creation (e.g., in a case where data related to interactions between users and agents using multimodal interfaces is not available, the grammar could be produced without that data). Indeed, one beneficial aspect of the approach to grammar creation described herein is that it can easily accommodate new information sources which could potentially create richer or more robust grammars. Accordingly, the table of FIG. 1, and the accompanying discussion, should be understood as being illustrative only, and not limiting.

Also, while the description above was structured in teens of ascending levels of abstraction according to the hierarchy of FIG. 6, it should be understood that creation of a grammar does not need to follow that structure. For example, it is also possible that a grammar could be created using a bootstrap methodology, where a grammar is first created using one data source, then refined using other information as it becomes available. An example of this "bootstrap" approach could begin by using techniques such as described above to create a grammar from a website. Once the grammar had been created, it could then be used to gather further information. For instance, transcriptions of interactions between users and an automated system using the grammar created based on the website could be gathered. Similarly, an automated system using the grammar, and the website used to create the grammar could function as, respectively, voice and graphic portions of a multimodal user interface, thereby allowing for the collection of data regarding interactions with a multimodal interface. Of course, the description of bootstrapping above is not intended to indicate limits on the application of the described technology which are contemplated by the inventors. For instance, other applications of that process, such as starting grammars using transcriptions of interactions with agents, or manually created grammars, or combinations of various available data sources, are also possible.

Additionally, it is possible that bootstrapping such as described herein could be performed particularly for generative grammars used to determine prompts which should be provided by an automated system, either in addition to, or as an alternative to, using bootstrapping to create grammars (e.g., parsing grammars) which are used to process statements made by a user. As an example of this, consider a case where one or more generative grammars are used to determine statements which comprise a carrier phrase (i.e., a linguistic structure that embodies commonly used words to either acquire or present information) and a set of one or more content words which are associated with information which should be obtained to complete a transaction. As set forth above, a hierarchy of grammars can be used to determine what information is necessary to obtain from a user to complete a transaction. Using the carrier phrase—content word approach described, it is possible that generative grammars could be implemented so that generative grammars which could determine a system's response could be provided with only a relatively small number of sentences. Typical sentences which might be associated with various levels of a grammar hierarchy include (for the transaction level) "Would you like to <task name>?", (for the task level) "When do you want to <content word>?", (for the sentence/clause level) "What <content word> do you want?", or "Would you repeat that?" and (for the phrase or word level) "Did you say <word>?". For creating the sentences, the bootstrapping methodology could be used by beginning with a first type of information source for creating the generative grammars (e.g., a website, which could provide various words and sentences) and then refining and/or augmenting the generative grammars using further sources (e.g., using linguistic style conventions to determine standard sentences which would be more appropriate than those which might appear in a website). Thus, it should be understood that the approaches described herein are not limited to application in creation of grammars which are used to process user input, but can also be used in the creation of grammars used in determining system output. Of course, the specific types of grammars described for determining system output are intended to be illustrative only, and other types of grammars (e.g., generative grammars having more complicated production rules, or multiple layers of production rules used to transform terminal symbols such as words into acceptable nonterminal statements) are also possible. Accordingly, the description above should be understood as illustrative only, and not limiting.

A further variation contemplated by the inventors which could be implemented in some circumstances is to utilize a hierarchy which diverges from that depicted in FIG. 6. As a concrete example of how this type of variation could be implemented, consider a system which includes abstractions at greater than the transaction level, for example, a system which seeks to anticipate user needs in addition to the completion of one or more transactions a user might have had in mind when initiating an interaction. An interface for such a system could use a grammar such as might be created by using information about a user's non-transactional behavior. For instance, a user's browser logs could indicate that the user often visits certain types of websites (e.g., humor, politics, sports, etc. . . . ) and these logs could be used to create a grammar which combines multiple transactions into a more comprehensive model of the user's behavior. Accordingly, the hierarchy of FIG. 6, as well as the accompanying discussion, should be treated as illustrative only, and not limiting.

As an example of a further type of variation which could be applied to grammar creation processes such as described above, consider that, while the approaches described above are broadly applicable to systems for any problem domain for which information is available, determining how to populate various levels of the grammar could also be optimized for applications based on subject matter. This can be illustrated by the following approach to using transcriptions to populate a grammar. Initially, a commercially available speech recognizer can be used to generate transcriptions of interactions between users and automated systems. As a general rule, these transcriptions will include some errors, such as misrecognitions and mistranscriptions. However, these errors can be minimized, at least to some extent, by applying multiple recognizers to the data, thereby obtaining a combined transcription which could be more accurate than the transcriptions of any of the recognizers individually. The transcriptions can then be used to train one or more of the speech recognizers towards one which is better suited to the specific domain or task for which the grammar will be utilized, such as by filtering out garbage or non-important words, and re-defining the new vocabularies that the speech recognizer can recognize. By an iterative process of adapting a speech recognizer, a recognizer can be obtained which is most effective in the domain for which the grammar is being created.

As yet another potential approach to implementing a grammar which could be used in an interface to an interactive system such as an IVR, consider a case where a website is organized into a hierarchy having leaf and ancestor pages, where the individual leaf pages represent transactions (e.g., information requests) a user might wish to complete using the website. In such a case, a grammar comprising a statistical n-gram language model and statistical classifier could be created by culling information from a website which, along with weights assigned to that information using a method such as described herein, and using that information as training data for the grammar. An algorithm which could be used to gather and determine weights for training data in such a classification grammar is depicted in the pseudo-code of FIG. 5. In that pseudo-code, there are a set of nested loops. The first of those loops, starting with the first statement in FIG. 5, indicates that the statements for that loop will be repeated for each leaf class in a website. Such a structure can be used when there is to be a grammar with a single class corresponding to each leaf page, and where the commands in the loop started by the first statement [507] are used to gather and weight the training data for those classes. In terms of actually gathering the training data for the class, to train a class for leaf L, the algorithm of FIG. 5 gathers data from the ancestor pages of L (this is accomplished by the first two steps [503][504] in the inmost loop in FIG. 5) and adds that data to a set of training data for the class corresponding to leaf L (this is specified by the last step [501] in the inmost loop in FIG. 5). Also, in FIG. 5 the data from the ancestor pages are assigned weights of 1/H when added to the set of training data for the class corresponding to leaf page L, with H representing the number of links separating page L from the ancestor page where the data was found (this weighting is also specified by the last step [501] in the inmost loop in FIG. 5). After the data from the ancestor pages has been added to the set of training data, the algorithm of FIG. 5 continues with similar gathering of data from the leaf page L (this data gathering is accomplished by the first two steps [505] [506] after the inmost loop in FIG. 5), which data is also added to the set of training data (accomplished by the third step [502] after the inmost loop in FIG. 5).

Figure 4:
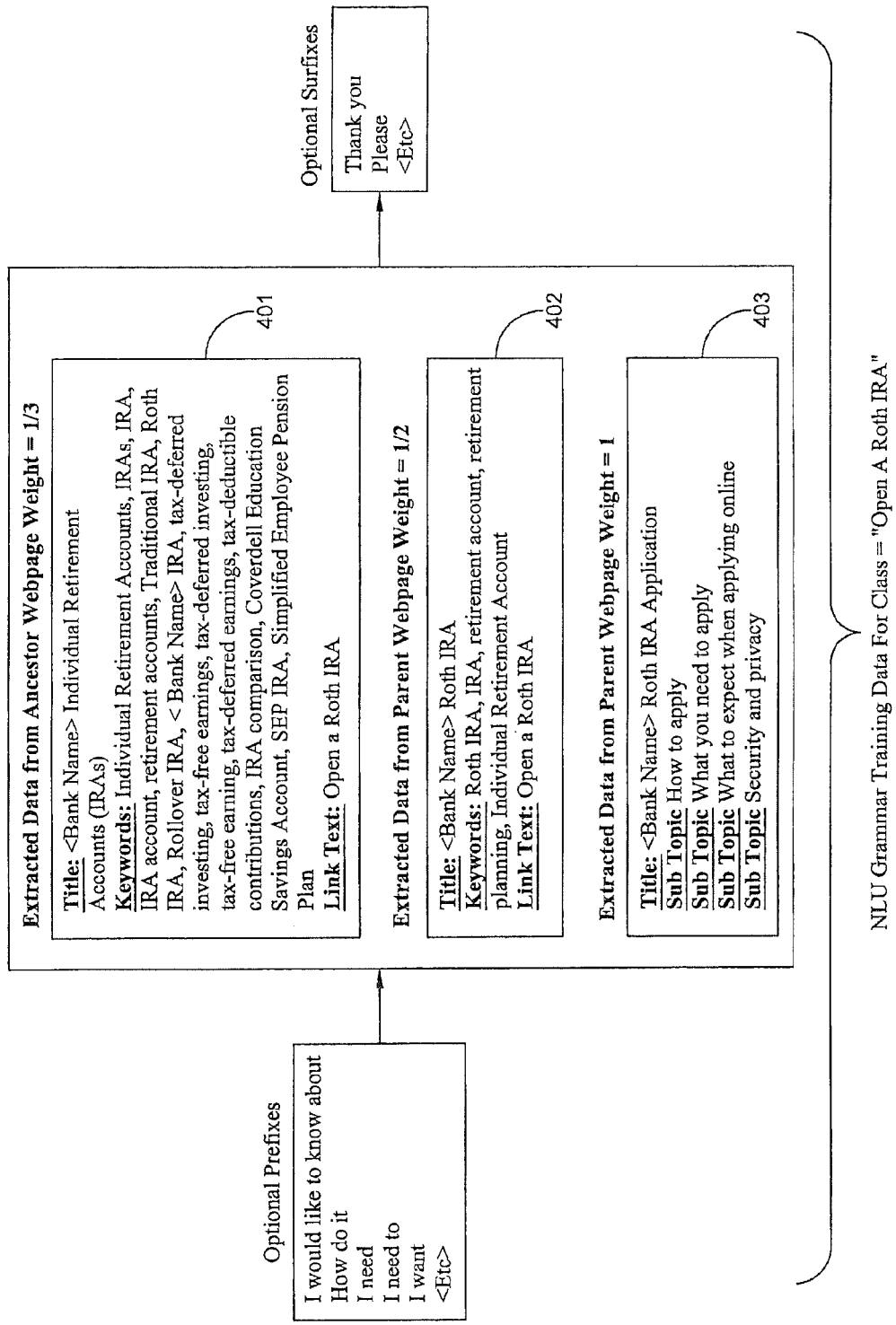
FIG. 4 provides an example of training a natural language grammar using data from a website.

An example of data which could be gathered using an algorithm such as shown in FIG. 5, and subsequently used to train a grammar class for "Open a Roth IRA," along with prefixes and suffixes which could be used to adorn the training data is depicted in FIG. 4. In FIG. 4, three sets of data [401] [402][403] collected from three separate web-pages from a website are used for training a grammar class. As discussed above with respect to FIG. 5, the different sets of data are given different weights, with data from more distant ancestor pages being given less weight than the data from closer ancestor pages, or from the leaf page itself. Additionally, as shown in FIG. 4, the data culled from the various web pages could also be adorned with various prefixes [404] (e.g., "How do I . . . ", "I need to . . . ", etc) and suffixes so that the grammar can be trained with a set of data which more accurately reflects the likely input to be received from users in the future. This can be useful in cases where a website, while having information relevant to the user's transaction, would not necessarily have language reflecting what a user might say to an interactive system. By the use of appropriate carrier phrases, such limitations of collecting training data for use in creating an interface for a system having a different type of input modality can be addressed.

Of course, it should be understood that the algorithms of FIGS. 4 and 5 are intended to be illustrative only, and not to indicate limits on the types of data gathering techniques contemplated by the inventors. For example, instead of relying on data in HTML code (e.g., boldface tags), it is possible that various language processing techniques (e.g., keyword identification) could be used to gather the set of data used for training a grammar class. Similarly, while the algorithm shown in FIG. 5 depicted assigning weights of 1/H to data from ancestor pages, where H was the number of links followed to reach the leaf page from the ancestor page, other weighing mechanisms, such as modifying weights according to the relevance of particular data based on keyword analysis, or based on logs of actual website use data showing how users travel from an ancestor page to a leaf page could also be used. Further, the data gathering techniques such as described with respect to FIGS. 4 and 5 could be modified to deal with potentially irrelevant words being included in the training data. For example, in a case where text between boldface tags is generally added to the training data for a grammar, there could be an automated filtering process with a rule which states that boldface text should be considered a subtopic or task appropriate for the training data if the boldface text is followed by one or more sentences of non-boldface text. Accordingly, the discussion of FIGS. 4 and 5 above should be understood to be illustrative only, and not limiting.

Figure 1:
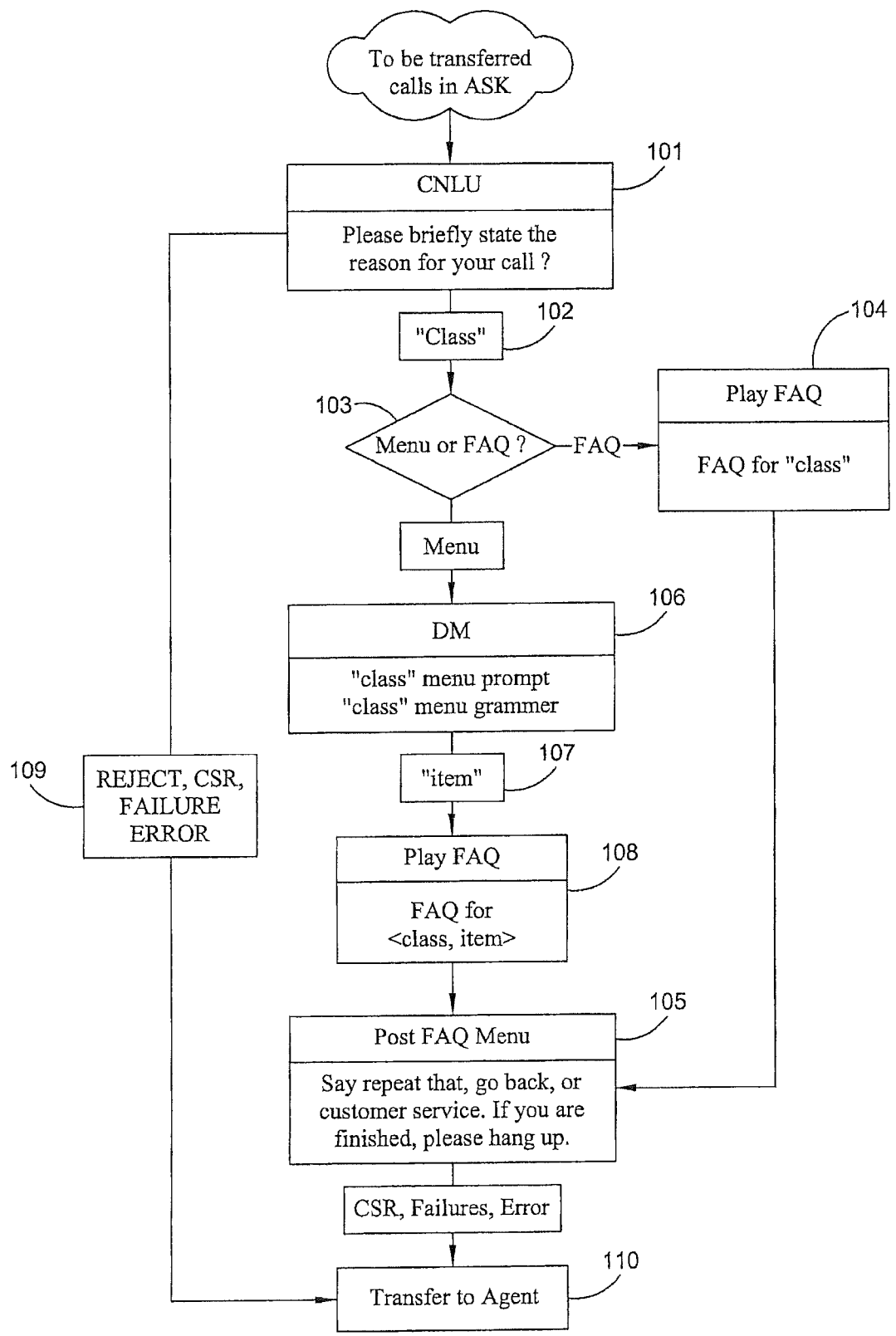
FIG. 1 depicts a state diagram showing how interactions between an individual seeking information and an automated system might be structured.

As an example of how a grammar created using training data such as described above could actually be used in an interactive system such as an IVR, consider the diagram of FIG. 1, which figure depicts a state diagram showing how interactions between an individual seeking information and an IVR might be structured. In FIG. 1, the interaction begins in an initial information gathering state [101] in which the IVR prompts the caller to specify the reason for his or her call. Such a prompt might be a HMIHY prompt, (i.e., an open ended prompt which informs the user that input is expected). As an example of this, if a dialog, such as depicted in FIG. 1, was deployed by a retirement service provider (e.g., a bank), the system might provide an initial prompt of "Please briefly state the reason for your call." The NLU grammar at this dialog point may contain a large number (>1000) of classes derived from the leaf pages of a website to recognize a wide spectrum of caller responses. The caller might provide a sentence or phrase, such as "Lost IRA application." As shown in FIG. 1, the caller's statement would be categorized by the system into a particular class [102] which would determine the subsequent operation of the system. For instance, the system would determine whether the user's statement was associated with a transaction which could be completed without further information being provided (e.g., asking a question associated with a frequently asked question response), or whether more information was necessary, as might be the case where a user asked about a transaction which requires manipulating a menu [103]. For example, if the user's statement was categorized into a class associated with a leaf page which was a frequently asked question response, then the system could play the frequently asked question response [104], and then might transition to a post FAQ menu [105], or some other appropriate statement. So, to continue the example above, in response to the statement "Lost IRA application," the system might provide the following frequently asked question response: "If an application does not arrive within sufficient time (usually 14 days) please fill out IRA Form 2345, Application Loss/Misdirection Report." The post-FAQ menu could then be a statement presenting generic choices, such as "Please say repeat that, go back, or customer service. If you are done, please hang up." which could be presented after any frequently asked question response.

Continuing with the discussion of FIG. 1, in some cases, a user's statement might be allocated to a class which would not allow the system to immediately complete the transaction, as was the case with the FAQ response class discussed above. For example, the user made a statement which indicated a class associated with a transaction that required manipulating a menu, the system could then use the grammar to gather further information from the user and complete the transaction. For instance, if a user begins a transaction with a statement such as "I think I fell for a scam," the system could follow up with a prompt for the menu [106] such as "could you tell me what kind of a scam?" Additionally, in the case the user does not respond, the system can provide further information, such as known types of scams the user might have encountered. These types might have been taken from menu labels in the leaf page, and could allow a user who was not sure how to describe his or her request to use the automated system, rather than having to be transferred to a (more expensive) live agent. Further, in some cases a system could be configured so that, when it plays a prompt for information to disambiguate a customer's request, it could load a specific grammar that would help the system recognize and respond to the user's expected response. Continuing, once the customer disambiguates his or her request, in response to the prompt [107], the system could play a frequently asked question response for the specific information type indicated [108]. After the frequently asked question response had been played [108], the post-frequently asked question response menu (which might be generated by parsing a table) could be presented [105], as in the example presented above regarding a lost application. Thus, if, in response to a request for information about the kind of scam, the customer responds with a statement that includes the words "Miami Sweepstakes," the system could play the following frequently asked question response: "Reports of sweepstakes entries sold door-to-door to businesses and individuals and advertised on the Internet, have surfaced in recent months. In some cases, these false entries can be difficult to tell from bona-fide entries sold by retirement specialists. Buyers who suspect they have been sold counterfeits should compare them with entries purchased from a retirement specialist, and contact their local better business bureau. To prevent future scams, buyers can purchase entries at their local Retirement Services Office, or on line at The Retirement Services Store."

Of course, even within a system implementing an interaction flow such as shown in FIG. 1, variations on the descriptions above are possible. For example, if a customer, in response to an initial prompt [101], makes a statement which cannot be associated with a particular class [109], then the caller could be transferred to a customer service representative [110], and information about the user's subsequent interactions with the customer service representative could then be used to improve the system (e.g., as per the "bootstrapping" approach set forth previously). Similarly, in some situations where an automated system is implemented to engage in interactions according to FIG. 1, the system could be designed so that, instead of simply identifying a class, the system both identified and confirmed the class, perhaps by providing a prompt such as "You're calling regarding X. Is that correct?" In addition, while the discussion of using websites in the creation of grammars above focused on hierarchical websites organized into ancestor and leaf pages, it is also possible that similar techniques could be applied to other organizations. For example, in some websites, instead of having individual leaf pages representing transactions (or tasks, or sentences, as may be the case for particular websites) there could be strings of web-pages which are used (e.g., one page for entering a departure flight, followed by a page for entering a return flight, followed by a payment page, followed by a hotel page, etc). Thus, the discussion above should be understood as being illustrative of the technology developed by the inventors, and not limiting on the claims included in this, or any related application. Accordingly, except for terms explicitly defined herein, the claims should be interpreted to have a scope defined by the broadest reasonable interpretation of the claim terms, as provided by a general purpose dictionary. In the case that multiple definitions for a claim term are provided by one or more general purpose dictionaries, the claims should be treated as having meanings encompassing all such definitions. However, in a case where the written description implies a definition for one or more claim terms, but does not expressly define a claim term, that claim term should be interpreted to encompass the definition implied by the specification, as well as any definitions provided by a general purpose dictionary which are not excluded by the implied definition.

We claim:

1. A method comprising:
   a) receiving, at a computer, a first set of input data comprising a set of website data;
   b) defining a grammar, wherein:
      i) the grammar comprises a plurality of sub-grammars organized according to a hierarchy comprising a plurality of levels;
      ii) the grammar is defined based on data comprising:
         1) the first set of input data;
         2) a second set of input data; and
         3) a third set of input data;
      iii) the statements $|A\ B|-|A \cap B| \neq 0$ and $B\ C = A\ C$ are true where
         1) A is a first set of levels from the hierarchy in which at least one sub-grammar is defined based on the first set of input data;
         2) B is a second set of levels from the hierarchy in which at least one sub-grammar is defined based on the second set of input data; and
         3) C is a third set of levels from the hierarchy in which at least one sub-grammar is defined based on the third set of input data; and
   c) storing the grammar on a non-transitory computer readable medium.

2. The method of claim 1, wherein defining the grammar comprises an act taken from the set of acts consisting of:
   a) revising an existing version of the grammar; and
   b) creating the grammar.

3. The method of claim 1 wherein the statements $A\ B \neq B$ and $A\ B \neq A$ are true.

4. The method of claim 1, wherein:
   a) each sub-grammar from a lowest level from the plurality of levels comprises a vocabulary comprising words; and
   b) for each level above the lowest level in the hierarchy, a sub-grammar from that level comprises elements provided by a sub-grammar from the next lower level in the hierarchy.

* * * * *

UNITED STATES PATENT AND TRADEMARK OFFICE
CERTIFICATE OF CORRECTION

PATENT NO. : 8,335,690 B1
APPLICATION NO. : 13/351383
DATED : December 18, 2012
INVENTOR(S) : Bansal et al.

Page 1 of 1

It is certified that error appears in the above-identified patent and that said Letters Patent is hereby corrected as shown below:

Title page,

Item [75], change "Chang-Quin Shu, Manasses, VA (US)" to read "Chang-Qing Shu, Orlando, FL (US)".

Signed and Sealed this
Twelfth Day of March, 2013

Teresa Stanek Rea
*Acting Director of the United States Patent and Trademark Office*